Sept. 10, 1968    I. F. JAMES    3,400,979
SAFETY ARMREST
Filed Oct. 5, 1966    2 Sheets-Sheet 1
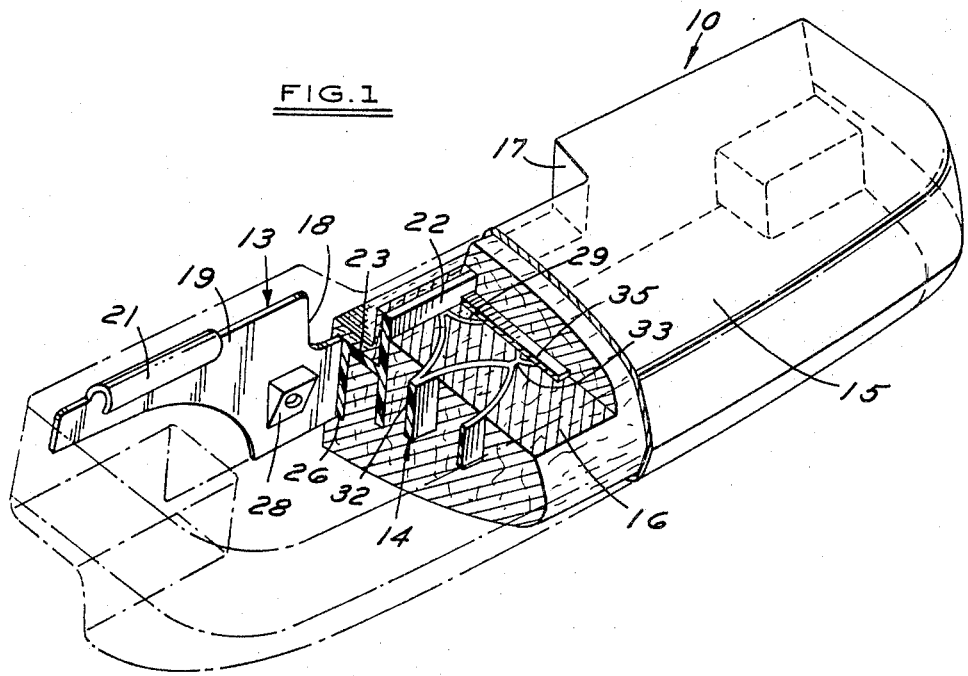
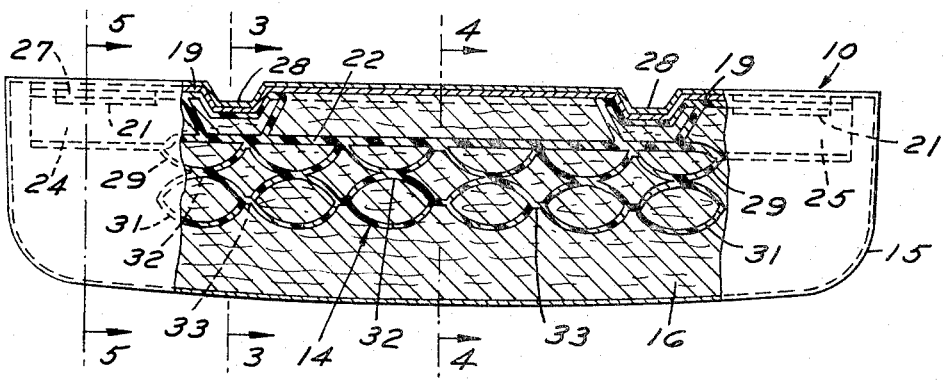
INVENTOR
IVOR F. JAMES
BY John R. Faulkner
John J. Roethel
ATTORNEYS Sept. 10, 1968   I. F. JAMES   3,400,979
SAFETY ARMREST
Filed Oct. 5, 1966   2 Sheets-Sheet 2
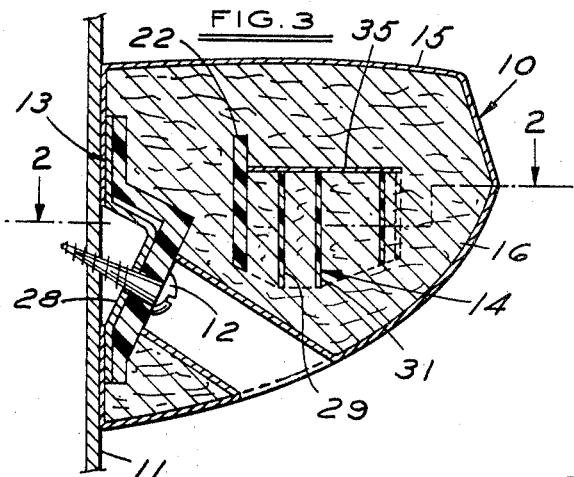
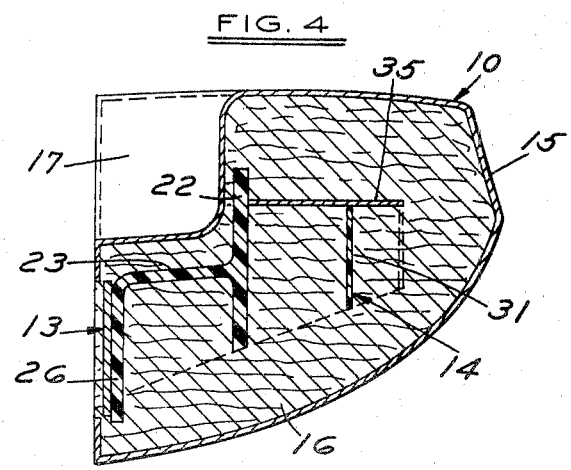
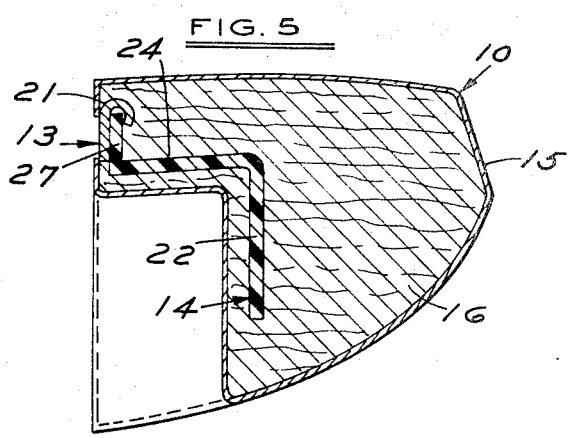
INVENTOR
IVOR F. JAMES
BY John R. Faulkner
John J. Roethel
ATTORNEYS United States Patent Office 3,400,979
Patented Sept. 10, 1968

3,400,979
SAFETY ARMREST
Ivor F. James, Southfield, Mich., assignor to Ford Motor Company, Dearborn, Mich., a corporation of Delaware
Filed Oct. 3, 1966, Ser. No. 583,535
7 Claims. (Cl. 297—412)

ABSTRACT OF THE DISCLOSURE

An upholstered unit, such as an armrest, for attachment to a vehicle body panel. The upholstered unit comprises a support plate and a plurality of support plate paralleling cells adapted to collapse under nonvertical forces applied toward the support plate but being resistant to collapse under forces applied in a direction substantially parallel to the support plate. The support plate and honeycomb member are covered by a formed plastic outer skin. The upholstered unit is given body or shape and cushioning function by a plastic form filler material which fills the outer skin and the interstices of the honeycomb member.

---

This invention relates to an upholstered unit having particular utility in vehicle bodies and more particularly to an armrest adapted to be mounted on a vertical inner panel of the vehicle body.

It has been conventional practice for many years to mount armrests and the like on inner vertical panels of the vehicle body to provide comfort and convenience to the vehicle occupants. The majority of these armrest structures are self-contained units adapted to be held to the panel by fastening devices such as clips or screws. One common type of armrest unit in use is a plastic shell forming a shelf on which a soft resilient pad is placed, the pad being filled with foam rubber or other resilient material. Another popular form of armrest is one in which an internal reinforcing and attaching member is covered by a plastic or vinyl outer skin and the latter is filled with a plastic foam material to give it body and cushioning effect.

The plastic shell type armrest and also the armrest having the rigid interior member normally are mounted to project into the interior space of the vehicle body. Under normal conditions this is not objectionable, since an armrest has the function of providing a shelf on which a person may rest his arm. It has been found, however, that armrest structures, like so many other structures which project into the vehicle body occupant space, can be a source of injury upon the person being thrown laterally of the seat against the vertical panel supporting the armrest when the vehicle is involved in a collision with a stationary object or other moving vehicle. It is, therefore, desirable that the armrest be collapsible toward the panel on which it is supported when subjected to nonvertical forces, i.e., forces in the direction other than those normally applied by the weight of a person's arm resting on the armrest.

It is therefore an object of the present invention to provide an upholstered unit, such as an armrest, which is adapted to be mounted on a panel of a vehicle body and which comprises a support plate for attachment to said panel. A honeycomb member, which may be formed of metal, paper or suitable plastic, is secured to the support plate and projects in a direction substantially normal to the surface of the latter. The honeycomb member has a plurality of support plate paralleling cells adapted to collapse under nonvertical forces applied toward the support plate but being resistant to collapse under forces applied in a direction substantially parallel to the support plate. The support plate and honeycomb member are covered by a formed plastic outer skin. The upholstered unit is given body or shape and cushioning function by a plastic foam filler material which fills the outer skin and the interstices of the honeycomb member.

As specifically applied to an armrest, the armrest is adapted to be mounted on a vertical panel of the vehicle body and comprises a support plate for attachment to the vertical panel. A honeycomb member is secured to the support plate and projects substantially horizontally away from the vertical panel and support plate. The armrest honeycomb member has a plurality of vertically extending cells collapsible toward the support plate under nonvertically applied forces but being resistant to collapse under vertically applied forces, such as a force applied by a person's arm resting on the upper surface of the armrest. A formed plastic outer skin covers the plate and honeycomb member and a plastic foam filler material fills the outer skin and the interstices of said honeycomb member to provide body and cushioning function to the armrest.

Other objects, advantages and features of the present invention will be apparent from the following description and appended claims, reference being had to the accompanying drawings forming a part of the specification wherein like reference numerals designate corresponding parts in the several views:

FIG. 1 is a perspective view illustrating the armrest embodying the present invention;

FIG. 2 is a plan view, in part sectional, taken along the line 2—2 of FIG. 3; and FIGS. 3, 4 and 5 are sectional views taken substantially on the lines 3—3, 4—4 and 5—5 of FIG. 2, respectively.

In the drawing there is illustrated, by way of example, a certain embodiment of the present invention as applied to an armrest generally designated 10, adapted to be mounted on the inner panel 11 (see FIG. 3) of a vehicle body by means of screw fasteners 12. Basically, the construction of the armrest 10 comprises a subassembly of a metal backup or support plate 13 and a honeycomb filler or insert 14 which may be made of metal, paper or plastic and which is cemented or otherwise secured to the backup plate with contact cement. The subassembly of the metal support plate 13 and the honeycomb filler 14 is then inserted into a plastic outer skin 15 made of a vinyl or other suitable plastic material. The void between the outer skin and the metal support plate and honeycomb filler subassembly is filled preferably with a polyurethane form filler material 16.

The shape of the various components of the armrest 10 may be quite varied since armrests come in a wide variety of styling configurations. The illustrated armrest is quite simple in contour having primarily the indentation 17 which functions as a finger grip so that the armrest can be used as a door pull.

The support or backup plate 13 is illustrated as being a flat piece of sheet metal having a centrally located indentation 18 to accommodate the finger grip portion of the armrest and a pair of longitudinally extending wing portions 19, only one of which is visible. Each wing portion is provided with a curled over flange 21 along its upper edge for a purpose to be explained.

The construction of the honeycomb filler 14 is an important feature of the present invention. This honeycomb filler 14 may be made of metal, paper or plastic with preference being for a polypropylene type plastic. It comprises a main vertical wall portion 22 which is substantially equal in length to the metal support or backup plate 13. This main wall portion 22 does not contact the backup plate but is held in spaced relationship to the latter by horizontal shelf portions 23, 24 and 25. The center shelf portion 23, see FIG. 4, underlies the finger grip depression 17 in the armrest 10. The center section 23 has a depending flange 26 which is adapted to be bonded or otherwise secured to the metal plate 13. The end shelf portions 24 and 25, respectively, are each provided with an upstanding flange 27 which fits under the curled over flange 21 on the support plate. In subassembly of the two components, the curled over flange 21 is crimped to tightly engage and hold the honeycomb filler 14 in place. This is an insurance factor since the filler 14 is contact cemented to the metal plate.

As seen in FIG. 3, provision is made for mounting the armrest on the panel 11. Intermediate the ends of the metal support plate 13 and the honeycomb filler 14, they are indented to provide bracket portions 28 adapted to receive the metal screws 12 for holding the armrest assembly 10 to the back panel 11 in a conventional manner.

On the side of the main wall 22 away from the support plate 13, the main wall is provided with a plurality of honeycomb cells through which the honeycomb filler derives its function and purpose. In the illustrated embodiment of the invention, the honeycomb cells comprise a first row of semi-elliptical cells 29 which are molded integrally with the main wall 22. Supported on the first row 29 is a second row of wholly elliptical cells 31, adjacent cells 29 and 31 having common tangential portions, as at 32, and the row of cells 31 being joined by rib portions 33 interposed between each pair of adjacent cells. The walls of the cells are relatively thin and it will be readily apparent that the cells individually and the rows of cells collectively are collapsible under any forces in the direction of the main wall. Since the cells are vertically elongated, as seen in FIGS. 1 and 3, the cells are not collapsible in the direction of their vertical length. At least, the cells are designed not to collapse under the weight that the armrest would be required to carry by a person resting his arm on the same.

The metal support plate 13 and the honeycomb filler 14 preferably are subassembled and the interstices of the honeycomb cells may be prefilled with the plastic foam filler material 16 at the time the subassembly is manufactured.

The outer skin 15 of the armrest 10 is a preformed or premolded component and has openings, as indicated at 34 in FIG. 4, along its rear face. The support plate 13 and honeycomb filler 14 subassembly is inserted into the skin 15.

It has been found desirable prior to the insertion of the subassembly into the skin to place a thin sheet of paper or fiberboard 35 across the top of the honeycomb cells. This may be held in place by the application of cement so that it will be retained during the assembly operation. After the subassembly is within the outer skin, the armrest is then filled with a suitable foaming agent to produce the filler material 16 which gives body to the armrest and also provides the cushioning function. After a suitable curing period, the armrest is then ready for mounting on a vehicle inner panel.

The construction and arrangement of the armrest embodying the present invention has the advantage that it, because of the orientation of the honeycomb cells, is collapsible toward the vehicle panel upon the application of forces in a direction toward the panel. Thus, if a vehicle occupant is thrown sideways in the direction of the vehicle panel, the armrest embodying the present invention provides sufficient collapse to act as an energy absorption device. It further acts to prevent injury to the person's body such as might be caused by an armrest comprising a pad mounted on a rigid base member or an armrest having a rigid horizontally extending insert. The present armrest provides sufficient vertical support for the arm of a person resting thereon because of the vertical orientation of the longitudinal axes of the honeycomb cells. The sheet material 35 laying over the cells is easily distortable so as not to form an injury causing element of itself.

It will be understood that the invention is not to be limited to the exact construction shown and described, but that various changes and modifications may be made without departing from the spirit and scope of the invention, as defined in the appended claims.

I claim:
1. An upholstered unit adapted to be mounted on a panel of a vehicle body comprising:
   a support plate for attachment to a panel,
   a honeycomb member having a plate portion secured to said support plate,
   said honeycomb member projecting in a direction substantially normal to the surface of said support plate,
   a plurality of support plate paralleling cells on said honeycomb member collapsible under force applied in the direction of said support plate and resistant to collapse under force applied in a direction substantially parallel to said support plate,
   said support plate paralleling cells comprising a first row of semi-elliptical cells integrally formed on said plate portion and at least a second row of wholly elliptical cells integrally coupled to said first row,
   a formed plastic outer skin covering said plate and honeycomb member,
   and a plastic foam filler material filling said outer skin and the interstices of said honeycomb member to provide body and cushioning function to said upholstered article.

2. An upholstered unit according to claim 1 in which:
   the honeycomb member has a plate portion mounted against said support plate, and
   said support plate paralleling cells comprise a first row of semi-elliptical cells integrally formed on said plate portion and at least a second row of wholly elliptical cells integrally coupled to said first row.

3. An upholstered unit according to claim 1 in which:
   the upper edges of said support plate paralleling cells define a common plate, and
   said upper edges are covered by a planar sheet of material to prevent the edges from cutting into the foam filler material upon the application of forces to the upholstered unit in a direction substantially parallel to said support plate.

4. An armrest adapted to be mounted on a vertical panel of a vehicle body comprising:
   a support plate for attachment to said vertical panel,
   a honeycomb member secured to said support plate projecting substantially horizontally away from said panel and support plate,
   said honeycomb member having a plurality of vertically extending cells collapsible toward said support plate under nonvertically applied forces and resistant to collapse under vertically applied forces,
   a formed plastic outer skin covering said plate and honeycomb member,
   and a plastic foam filler material filling said outer skin and the interstices of said honeycomb member to provide body and cushioning function to said armrest.

5. An armrest according to claim 4 in which the honeycomb member comprises an integral unit having:
   a plate portion mounted against said support plate and,
   in which said vertically extending cells comprise a first row of semi-elliptical cells formed on said plate portion and at least a second row of wholly elliptical cells coupled to said first row in spaced relationship to said plate portion.

6. An armrest according to claim 5 in which:
   the walls of said cells are relatively thin with the upper edges lying in a substantially common plane,
   said upper edges being covered by a sheet material member to prevent said cell walls from penetrating into the foam material thereabove upon the application of vertical forces on the upper surface of said armrest.

7. In an armrest according to claim 4 in which:
the walls of said cells are relatively thin with the upper edges lying in a substantially common plane,
said upper edges being covered by a sheet material member to prevent said cell walls from penetrating into the foam material thereabove upon the application of vertical forces on the upper surface of said armrest.

References Cited

UNITED STATES PATENTS

| 3,362,749 | 1/1968 | Clement | 297—412 |
| 2,760,813 | 8/1956 | Colm | 296—153 X |
| 3,181,205 | 5/1965 | Frommelt | 296—24 X |
| 2,744,042 | 5/1956 | Pace | 296—31 |

PHILIP GOODMAN, *Primary Examiner.*